EMILIO LONGAN Y SENAN.
CEMENT AND CONCRETE.
APPLICATION FILED FEB. 4, 1920.
1,406,421.   Patented Feb. 14, 1922.
Calcined pulverized granite added to cement clinker to take up free lime in cement & make alkali-water resistant concrete.
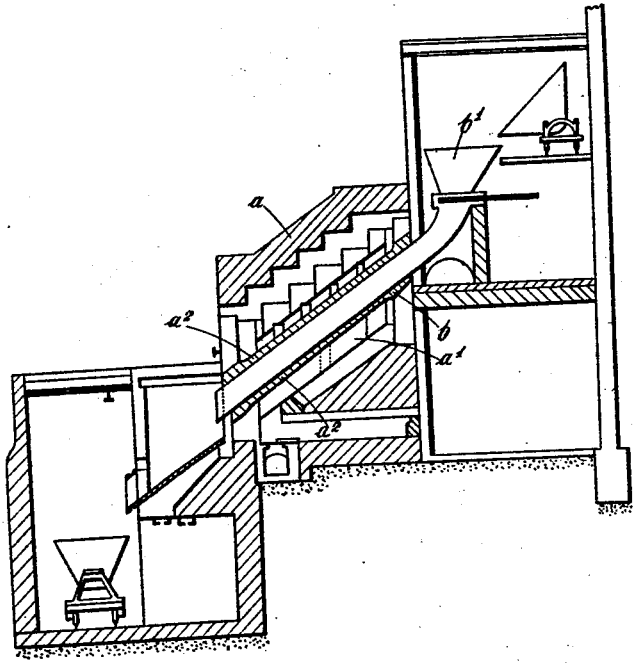

UNITED STATES PATENT OFFICE.

EMILIO LONGAN Y SENAN, OF AYTONA, SPAIN, ASSIGNOR TO ALBERTO GODI DI GODIO, OF GENOA, ITALY.

CEMENT AND CONCRETE.

1,406,421. Specification of Letters Patent. Patented Feb. 14, 1922.

Application filed February 4, 1920. Serial No. 356,294.

(GRANTED UNDER THE PROVISIONS OF THE ACT OF MARCH 3, 1921, 41 STAT. L., 1313.)

*To all whom it may concern:*

Be it known that I, EMILIO LONGAN Y SENAN, a subject of the King of Spain, residing at Calle del Arrabal, Aytona, in the Kingdom of Spain, have invented certain new and useful Improvements in or Relating to Cements and Concretes, (for which I have filed applications in Great Britain, July 27, 1914, Patent No. 17,756; Germany, No. 293,124, Aug. 3, 1914; Spain, Feb. 8, 1915; Italy, April 22, 1915; France, Dec. 9, 1915,) of which the following is a specification.

This invention relates to the treatment of cements or hydraulic limes which contain free lime and to concretes made from the product obtained, the chief object being to increase the hydraulicity or setting power thereof and incidentally render the same in the best condition for use in street paving and the erection of structures of all kinds including sub-aqueous structures.

The free lime contained in the cement or hydraulic lime is the ingredient which impairs the hydraulicity thereof, but by causing the free lime to react with materials containing silica and alumina this defect is overcome. The constituents or compounds which determine the hydraulicity or setting property of the cement or hydraulic lime are represented by the following formulæ:

(1) $2CaO.SiO_2$
(2) $CaOAl_2O_3$

Attempts have been made to act on the free lime in this way by adding calcined clay, puzzuolana and other similar substances to the cement or hydraulic lime but it has been found in practice that the hydraulicity of the product is not much improved by such additions.

According to this invention the free lime in the cement or hydraulic lime is caused to re-act with a suitable proportion of granite 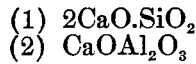 or diorite which has been heated for at least two hours at a temperature of about 1000° centigrade and converted into a fine powder. When granite or diorite is heated in this manner it is found that the proportion of active silica therein is increased and that the material is rendered of a more friable character without its crystalline nature being destroyed, and is done so that it may be reduced to a very fine powder more easily. The powder is such that when it is intimately mixed with the cement or hydraulic lime the silica is capable of acting on the free lime in a most effective manner. In fact the heat forms a molecular structure which is completely different from that of the original material and treated in this way it has no tendency to revert to its original condition.

In order that the said invention may be clearly understood and readily carried into effect I will proceed to describe the same more fully with reference to the accompanying drawing which shows a form of gas heated furnace suited for the treatment of the granite or diorite.

The furnace $a$ which is shown by way of example, consists of an inclined tube $b$ which is in contact with the gas flame. The tube $b$ may be made of cast-iron or some other suitable material and the portion thereof in proximity to the fire box $a^1$ of the furnace is protected by a covering or jacket $a^2$ of refractory material. Suitable tuyères or other means are provided for producing a current of air through the material in the tube $b$. The dimensions and details of the various parts of the furnace will vary according to circumstances and the desired output of the furnace. In ordinary circumstances however, the length of the tube $b$ should not exceed 7 metres and the diameter 70 cm. while the thickness of the walls should not exceed 200 mm. Assuming that the specific heats of the rocks or materials to be heated do not differ considerably, and if the disintegration is uniform with a furnace of these dimensions, the difference of temperature between the ends and the central portion of the tube will not exceed 200° centigrade. This difference in temperature will not impair the reaction provided that a temperature of 1000° centigrade is attained at the coolest part of the tube.

The granite or diorite is first broken or crushed in pieces so as to pass through a sieve or screen of 10 cm. mesh. The broken material is then introduced into the tube $b$ of the furnace through the hopper $b^1$ arranged at its upper extremity and subjected to a temperature of 1000° centigrade for a period of not less than two hours. The material is then removed at the bottom of the tube *b* and converted into a fine powder and intimately mixed with the hydraulic cement or lime which is also in a finely powdered condition. In this manner a perfect contact is obtained between the constituents that are intended to react.

It will be understood that the mixing must be effected on the basis of the chemical composition of the cement and rock used and the proportions are ascertained by the usual chemical and petrographic methods. In the case of the cement it is advantageous to prepare the same with a large percentage of free lime.

The improved product, obtained in the manner hereinbefore described and presenting good setting properties, may be utilized to obtain a concrete which is specially adapted for building structures which have to present great resisting power. With this object in view a rock, of the same nature as that used in the preparation of the improved hydraulic product is calcined and broken in pieces about the size of nuts. The rock or stone however, should never contain lime and it must be carefully washed with water containing no calcareous salts. After drying in air, it must be moistened before being mixed with the improved hydraulic product.

The concrete obtained in this manner is very compact and presents the appearance of a monolith of an almost homogeneous nature. The resulting product presents great resistance to tension, compression, and shocks of all kinds and is far superior in this respect to all concretes and compositions at present on the market. Moreover, it is not harmfully affected by sea water but on the contrary the salts dissolved in the water act favourably and assist the chemical reactions that take place in the mass. The concrete owing to its properties is especially adapted for use in street paving and for the construction of all land and marine structures which have to present great resistance.

What I claim and desire to secure by Letters Patent of the United States is:—

1. A process of manufacturing concretes or similar products of great resisting power, which consists in adding to cement finely powdered granite, and adding to the mixture a ballasting material constituted by calcined fragments of granite of the same nature as that used in the preparation of the cement mixture, whereby the free lime in the cement is caused to react with the powdered granite while the cement reacts chemically upon the surface of the ballasting material so as to produce a monolithic concrete of great resistance.

2. A process of manufacturing concretes or similar products of great resisting power, which consists in adding to cement a finely powdered and extremely hard granular, crystalline and igneous rock rich in silica and alumina and poor in lime, and adding to the mixture a ballasting material constituted by calcined fragments of rock crystalline of the same nature as that used in the preparation of the cement mixture, whereby the free lime in the cement is caused to react with the powdered rock while the cement reacts chemically upon the surface of the ballasting so as to produce a monolithic concrete of great resistance.

3. A process for the manufacture of concrete possessing great resistance and rapid setting power, which consists in mixing with ordinary cement an extremely hard granular, crystalline and igneous rock rich in silica and alumina and poor in lime, which has been heated for at least two hours at a temperature of 1000° centigrade, and thereafter pulverized, together with fragments of rock of the same character as that mixed with the cement.

4. A process of manufacturing concretes or similar products of great resisting power, which consists in adding to cement finely powdered granite which has been heated for at least two hours at a temperature of 1000° centigrade, and thereafter pulverized, and adding to the mixture a ballasting material constituted by fragments of granite, which have been broken into pieces about the size of nuts and washed with water containing no calcareous salts, the fragments being thereafter dried in air and moistened with water before being mixed with the cement.

5. Cement or hydraulic lime in which the free lime has been caused to react with granite, which has been heated for at least two hours at a temperature of about 1000° centigrade and afterwards converted into a fine powder for the purpose specified.

6. Concretes or similar products of great resisting power consisting of cement whereof the free lime has been caused to react with granite which has been heated for at least two hours at a temperature of about 1000° centigrade and afterwards converted into a fine powder and to which there has been added calcined fragments of granite of the same nature as that used in the preparation of the cement.

EMILIO LONGAN y SENAN.

Witnesses:
 WILLIAM P. SHOCKLEY,
 CRYUS PAUTVEYARA.